(12) United States Patent
Shen et al.

(10) Patent No.: US 10,882,754 B2
(45) Date of Patent: Jan. 5, 2021

(54) METHOD FOR PREPARING TRANSPARENT FREE-STANDING TITANIUM DIOXIDE NANOTUBE ARRAY FILM

(71) Applicant: SOUTH CHINA UNIVERSITY OF TECHNOLOGY, Guangdong (CN)

(72) Inventors: Wenhao Shen, Guangdong (CN); Xin Tong, Guangdong (CN); Xiaoquan Chen, Guangdong (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 132 days.

(21) Appl. No.: 16/320,471

(22) PCT Filed: Nov. 20, 2017

(86) PCT No.: PCT/CN2017/111793
§ 371 (c)(1),
(2) Date: Jan. 24, 2019

(87) PCT Pub. No.: WO2018/095290
PCT Pub. Date: May 31, 2018

(65) Prior Publication Data
US 2019/0241441 A1    Aug. 8, 2019

(30) Foreign Application Priority Data
Nov. 22, 2016 (CN) .......................... 2016 1 1024735

(51) Int. Cl.
*C25D 11/26* (2006.01)
*B01J 21/06* (2006.01)
(Continued)

(52) U.S. Cl.
CPC ........ *C01G 23/0475* (2013.01); *B01J 21/063* (2013.01); *B82Y 30/00* (2013.01);
(Continued)

(58) Field of Classification Search
CPC ..................................................... C25D 11/26
See application file for complete search history.

(56) References Cited

U.S. PATENT DOCUMENTS

2010/0311615 A1* 12/2010 Qu ......................... B82Y 40/00
506/22

FOREIGN PATENT DOCUMENTS

CN    102485969 A * 6/2012
CN    102534630 A * 7/2012
(Continued)

OTHER PUBLICATIONS

Ma, Preparation, Modification and Application of TiO2 nanotubes/nanofibers, China Masters' Theses Full-Text Database, Partial Human translation. (Year: 2016).*

(Continued)

*Primary Examiner* — Brian W Cohen
*Assistant Examiner* — Ho-Sung Chung
(74) *Attorney, Agent, or Firm* — JCIPRNET

(57) ABSTRACT

The present invention provides a method for preparing a transparent free-standing titanium dioxide nanotube array film. In the method, with the titanium foil as a substrate, the titanium dioxide nanotube array film is obtained by anode oxidation on the surface of the titanium foil. Upon high temperature annealing, the titanium dioxide nanotube array film naturally falls off to obtain the transparent free-standing titanium dioxide nanotube array film. The method according to the present invention features simple operations, saves time and cost. With the method, a completely strippable titanium dioxide nanotube array film may be prepared, and in addition, morphology of the titanium dioxide nanotube is not damaged. The free-standing and complete titanium dioxide nanotube array film facilitates transfer and post-treatment, has the feature of transparency and may be in favor of (Continued)

the applications to the studies such as photocatalysis and the like.

5 Claims, 3 Drawing Sheets

(51) Int. Cl.
    *C01G 23/047*     (2006.01)
    *B82Y 40/00*     (2011.01)
    *B82Y 30/00*     (2011.01)

(52) U.S. Cl.
    CPC ............ *B82Y 40/00* (2013.01); *C01G 23/047* (2013.01); *C25D 11/26* (2013.01); *C01P 2002/72* (2013.01); *C01P 2004/03* (2013.01); *C01P 2004/13* (2013.01)

(56) References Cited

FOREIGN PATENT DOCUMENTS

| | | | |
|---|---|---|---|
| CN | 102660763 | A * | 9/2012 |
| CN | 102677123 | | 9/2012 |
| CN | 102718491 | A * | 10/2012 |
| CN | 103050287 | | 4/2013 |
| CN | 103132120 | | 6/2013 |
| CN | 104278311 | | 1/2015 |
| CN | 106498478 | | 3/2017 |
| JP | 2006026087 | | 2/2006 |

OTHER PUBLICATIONS

Mor et al., Fabrication of hydrogen sensors with transparent titanium oxide nanotube-array thin films as sensing elements, 496 Thin Solid Films 42 (Year: 2006).*
Dang et al., Machine Translation, CN 102485969 A (Year: 2012).*
Li et al., Machine Translation, CN 102718491 A (Year: 2012).*
Ma, Preparation, Modification and Application of TiO2 nanotubes/nanofibers, China Masters' Theses Full-Text Database, Information Page (Year: 2016).*
Biao et al, Machine Translation, CN 102534630 A (Year: 2012).*
Huang et al., Machine Translation, CN 102660763 A (Year: 2012).*
Dang et al., Partial Human Translation, CN 102485969 A (Year: 2012).*
Baojian MA, "Preparation, modification and application of TiO2 nanotubes/nanofibers", A Thesis Submitted to Chongqing University in Partial Fulfillment of the Requirement for the Professional Degree, College of Chemistry and Chemical Engineering of Chongqing University, Chongqing, China, May 2015, pp. 1-87.
"International Search Report (Form PCT/ISA/210)", dated Jan. 31, 2018, with English translation thereof, pp. 1-6.

* cited by examiner

METHOD FOR PREPARING TRANSPARENT FREE-STANDING TITANIUM DIOXIDE NANOTUBE ARRAY FILM

CROSS-REFERENCE TO RELATED APPLICATION

This application is a 371 application of International PCT application serial no. PCT/CN2017/111793, filed on Nov. 20, 2017, which claims the priority benefit of Chinese application no. 201611024735.3, filed on Nov. 22, 2016. The entirety of each of the above-mentioned patent applications is hereby incorporated by reference herein and made a part of this specification.

BACKGROUND

Technical Field

The present invention relates to the technical field of titanium dioxide nanomaterials, and in particular, relates to a method for preparing a transparent free-standing titanium dioxide nanotube array film.

Description of Related Art

People are increasing their concerns about environment pollution. Integrating the nano technology with the semiconductor photocatalytic technology and applying the same to the environment protection give new chances for treatment of the environment pollution. With the advantages of excellent photocatalytic performance and no secondary pollution, nanosized titanium dioxide has become one of the hot subjects for studies on the photocatalytic performance of the semiconductor materials. In addition, since titanium dioxide nanotubes have a great specific area and a special surface morphology, applying of the titanium dioxide nanotubes to the photocatalytic studies inevitably improves the photocatalytic performance, and creates more possibilities. Preparation of the titanium dioxide nanotubes by the anode oxidation method has a simple process and mild conditions. However, the titanium dioxide nanotubes obtained by this method take a titanium sheet as a substrate, and films may not be formed without support. This restricts further development and application of the titanium dioxide nanotubes. Therefore, on the premise of not damaging the morphology of the titanium dioxide array nanotubes, how to effectively cause the titanium dioxide array nanotubes to fall off the substrate and to obtain a free-standing film is the problem to be urgently solved.

At present, to obtain a free-standing titanium dioxide nanotube array film, a titanium dioxide nanotube array having a certain thickness is generally obtained on a titanium substrate firstly by the anode oxidation method, and then the nanotube array film is separated from the titanium substrate with secondary treatment by a physical or chemical process. The physical process mainly includes: separating the film by solvent evaporation, separating the film by ultrasonic vibration or bonding via adhesive tapes. However, the disadvantage of this process lies in that it is hard to obtain a large-area complete free-standing titanium dioxide film, and it is frequent that the film may not be separated and the morphology of the titanium dioxide nanotubes is damaged. The chemical process mainly includes: secondary anode oxidation and chemical solution dissolution. The secondary anode oxidation refers to, upon completion of the primary anode oxidation, carrying out secondary oxidation for the titanium sheet by changing the oxidation voltage or electrolyte temperature and causing the film to be separated in this process. However, the technique is relatively complicated. The solution dissolution refers to soaking the film with a chemical reagent such that the array film is separated, which, however, is time-consuming. In summary, the current process for preparing the titanium dioxide nanotube array film is complicated, and the obtained film has a relatively great thickness and a non-transparent appearance. According to the present invention, a titanium foil is used as an anode, and the titanium dioxide nanotube array film is prepared by the anode oxidation, with no need of the secondary treatment. Upon high temperature annealing, a complete and transparent titanium dioxide nanotube array film is obtained. This method saves time and cost, and causes no damage to the morphology of the film.

SUMMARY

The present invention is intended to provide a convenient and effective method for preparing a titanium dioxide nanotube array film which is free-standing and highly transparent.

To achieve the above objective, the present invention employs the following technical solution:

A method for preparing a transparent free-standing titanium dioxide nanotube array film includes the following steps:

(1) Using a titanium foil subjected to pre-treatment as an anode, using an inert electrode as a cathode, placing the cathode and the anode into an organic electrolyte, applying a voltage, and carrying out anode oxidation at room temperature; and upon completion of the oxidation, washing the anode with deionized water, naturally drying to obtain a titanium foil with a titanium dioxide nanotube array film grown on a surface thereof; and (2) Carrying out high temperature annealing for the titanium foil with the titanium dioxide nanotube array film grown on the surface thereof, and cooling to room temperature upon completion of the high temperature annealing, such that the titanium dioxide nanotube array film on the surface of the titanium foil falls off, and the transparent free-standing titanium dioxide nanotube array film is obtained.

Further, in step (1), the titanium foil has a thickness of 0.01-0.02 mm, and the titanium foil has a purity of 99.0-99.9%.

Further, in step (1), the pre-treatment includes ultrasonic cleaning the titanium foil sequentially in acetone, ethanol and deionized water for 10-20 minutes to remove oil contaminants on the surface of the titanium foil, and naturally drying the titanium foil.

Further, in step (1), the inert electrode includes a platinum electrode, a graphite electrode or a gold electrode.

Further, in step (1), the organic electrolyte is a glycol solution containing 0.55 wt % of ammonium fluoride and 5-20 wt % of deionized water.

Further, in step (1), the voltage applied in the anode oxidation is 30 V.

Further, in step (1), the anode oxidation lasts 2-6 hours.

Further, in step (2), the high temperature annealing is carried out in an air atmosphere by raising the temperature to 450° C. at a heating rate of 10° C./min and maintaining the temperature for 2-6 hours.

Further, in step (2) a temperature raising process of the high temperature annealing includes: raising the temperature to 100° C. at a heating rate of 10° C./min, and maintaining the temperature at 100° C. for 10 minutes; then raising the temperature to 200° C. at a heating rate of 10° C./min, and maintaining the temperature at 200° C. for 10 minutes; and raising the temperature to 300° C. and 400° C. at a heating rate of 10° C./min, and likewise maintaining the temperature at 300° C./min and 400° C. for 10 minutes respectively, until the temperature reaches 450° C.

The titanium dioxide in the titanium dioxide nanotube array film prepared by the above method has an anatase crystal shape.

Compared with the prior art, the present invention has the following advantages and achieves the following beneficial effects:

(1) According to the present invention, secondary treatment based on a physical or chemical method is not needed. Instead, with the titanium foil as a substrate, the titanium dioxide nanotube array film is obtained by anode oxidation on the surface of the titanium foil. Upon high temperature annealing, the titanium dioxide nanotube array film naturally falls off to obtain a transparent free-standing and complete titanium dioxide nanotube array film.

(2) The method according to the present invention features simple operations, saves time and cost. With the method, a completely strippable titanium dioxide nanotube array film may be prepared, and in addition, morphology of the titanium dioxide nanotube is not damaged. The free-standing and complete titanium dioxide nanotube array film facilitates transfer and post-treatment, and has the feature of transparency, and may be in favor of the applications to the studies such as photocatalysis and the like.

DESCRIPTION OF THE EMBODIMENTS

Figure 1A:
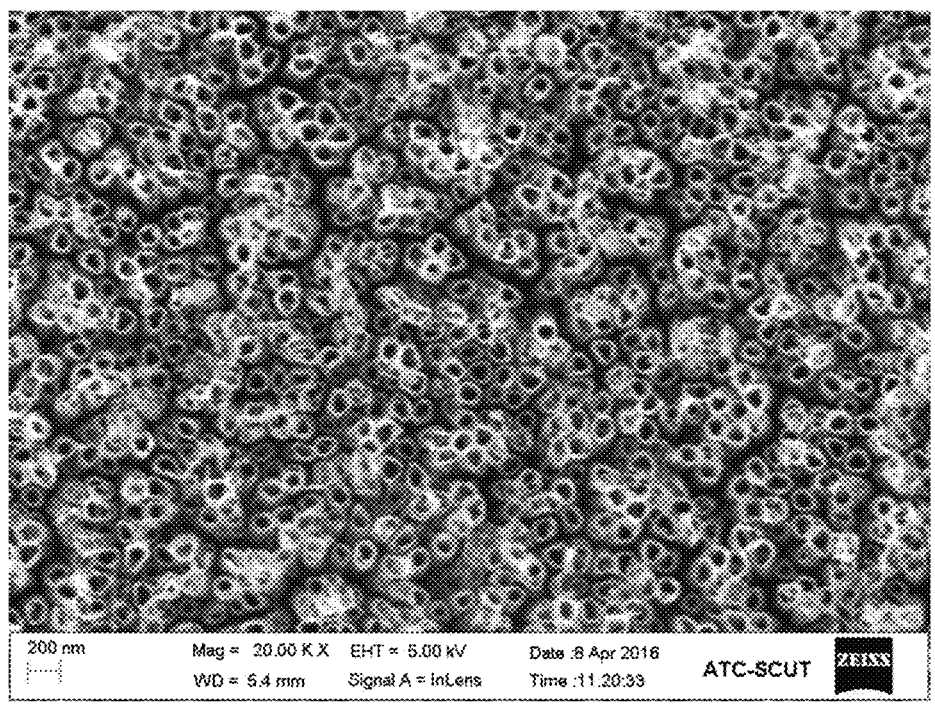
FIG. 1a and FIG. 1b are SEM images of a front surface of a transparent free-standing titanium dioxide nanotube array film prepared in Example 2 at different magnifications.

The present invention is hereinafter further described with reference to some examples. These examples are merely intended to illustrate the present invention instead of limiting the present invention.

EXAMPLE 1

(1) Pre-treatment of titanium foil: A titanium foil having a purity of 99.9% and a thickness of 0.01 mm was cut into a rectangular shape, the rectangular titanium foil was sequentially ultrasonically cleaned in acetone, ethanol and deionized water for 10 minutes to remove oil contaminants on the surface of the titanium foil, and then the titanium foil was naturally dried for future use.

(2) Anode oxidation: The pre-treated titanium foil was connected to a positive electrode of a power supply, and a graphite electrode was connected to a negative electrode of the power supply, a 2.5 cm spacing was defined between these two electrodes, an electrolyte is a glycol solution containing 0.55 wt % of ammonium fluoride and 20 wt % of deionized water, and an anode oxidation was carried out by applying a voltage of 30 V for 2 hours at room temperature; and upon completion of reaction, a prepared sample was cleaned with the deionized water and naturally dried to obtain a titanium foil with a titanium dioxide nanotube array film grown on the surface thereof.

(3) High temperature annealing: The titanium foil with the titanium dioxide nanotube array film grown on the surface thereof was placed into a Muffle furnace, the temperature was raised to 100° C. at a heating rate of 10° C./min and maintained at 100° C. for 10 minutes; the temperature was then raised to 200° C. at a heating rate of 10° C./min and maintained at 200° C. for 10 minutes; and finally the temperature was raised to 300° C. and 400° C. at a heating rate of 10° C./min and likewise maintained at 300° C. and 400° C. for 10 minutes respectively, until the temperature reached 450° C.; and the temperature was maintained at 450° C. for 2 hours, and then the furnace was cooled to room temperature to obtain a transparent free-standing titanium dioxide nanotube array film having an anatase crystal shape.

In the obtained transparent free-standing titanium dioxide nanotube array film, the titanium dioxide nanotubes have an average tube diameter of 110 nm, an average wall thickness of 13 nm and a tube length of 3.8 μm. Texts on the paper beneath the film can be clearly seen through the titanium dioxide nanotube array film.

EXAMPLE 2

(1) Pre-treatment of titanium foil: A titanium foil having a purity of 99.7% and a thickness of 0.01 mm was cut into a rectangular shape, the rectangular titanium foil was sequentially ultrasonically cleaned in acetone, ethanol and deionized water for 10 minutes to remove oil contaminants on the surface of the titanium foil, and then the titanium foil was naturally dried for future use.

(2) Anode oxidation: The pre-treated titanium foil was connected to a positive electrode of a power supply, and a platinum electrode was connected to a negative electrode of the power supply, a 2.5 cm spacing was defined between these two electrodes, an electrolyte is a glycol solution containing 0.55 wt % of ammonium fluoride and 20 wt % of deionized water, and an anode oxidation was carried out by applying a voltage of 30 V for 2 hours at room temperature; and upon completion of reaction, a prepared sample was cleaned with the deionized water and naturally dried to obtain a titanium foil with a titanium dioxide nanotube array film grown on the surface thereof.

(3) High temperature annealing: The titanium foil with the titanium dioxide nanotube array film grown on the surface thereof was placed into a Muffle furnace, the temperature was raised to 100° C. at a heating rate of 10° C./min and maintained at 100° C. for 10 minutes; the temperature was then raised to 200° C. at a heating rate of 10° C./min and maintained at 200° C. for 10 minutes; and finally the temperature was raised to 300° C. and 400° C. at a heating rate of 10° C./min and likewise maintained at 300° C. and 400° C. for 10 minutes respectively, until the temperature reached 450° C.; and the temperature was maintained at 450° C. for 2 hours, and then the furnace was cooled to room temperature to obtain a transparent free-standing titanium dioxide nanotube array film having an anatase crystal shape.

Figure 1B:
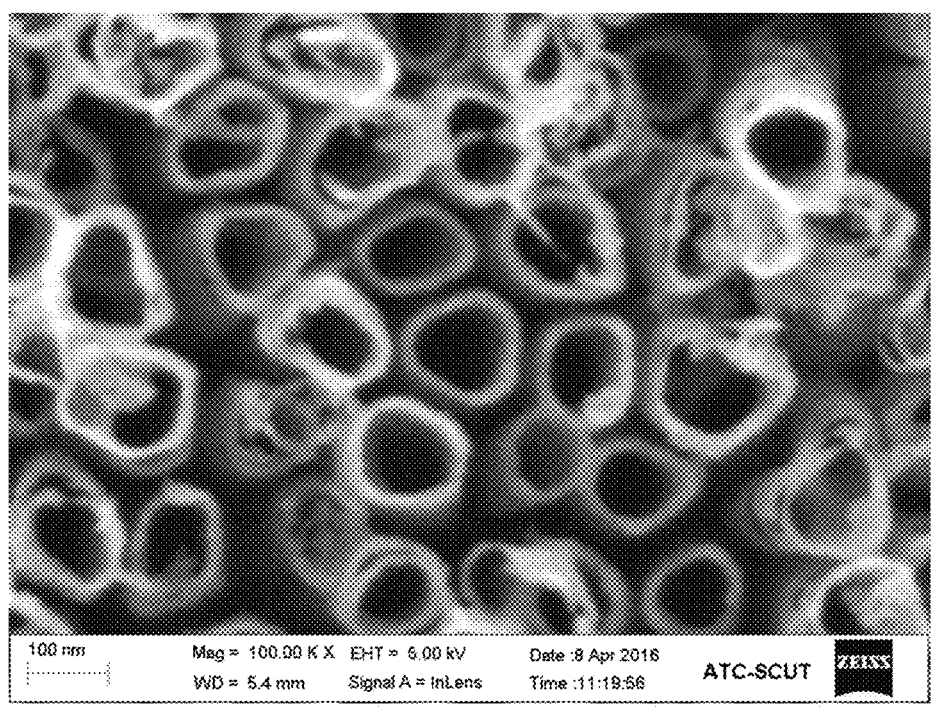

SEM images of a front surface of the obtained transparent free-standing titanium dioxide nanotube array film at different magnifications are shown in FIG. 1a and FIG. 1b. As seen from FIG. 1a and FIG. 1b, the titanium dioxide nanotubes in the film have an average tube diameter of 110 nm and an average wall thickness of 13 nm.

Figure 2A:
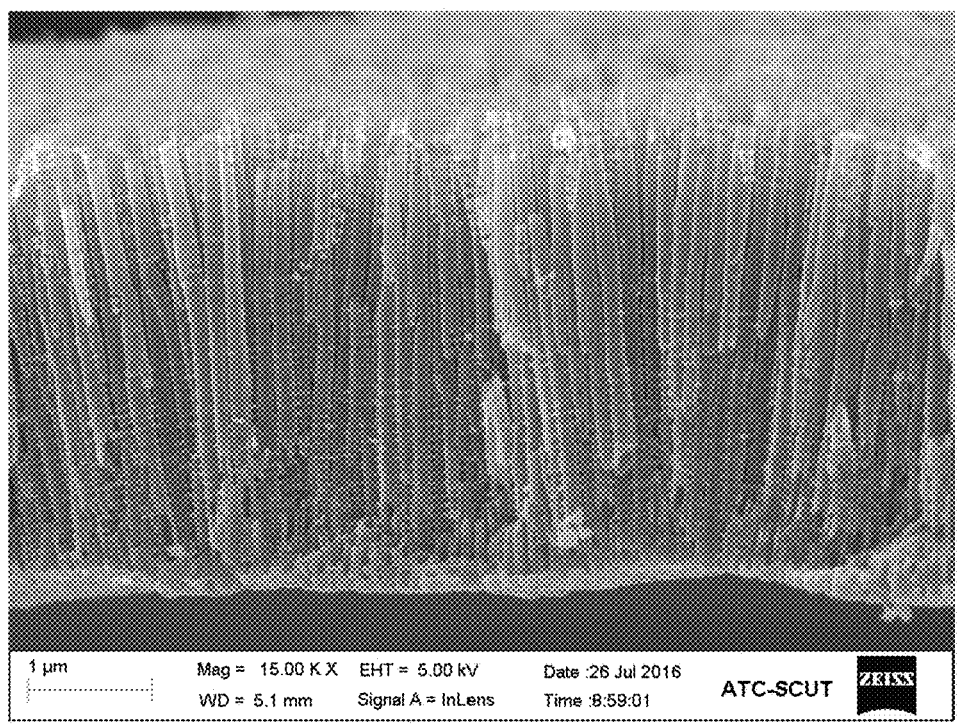
FIG. 2a is an SEM image of a side surface of the transparent free-standing titanium dioxide nanotube array film prepared in Example 2.
Figure 2B:
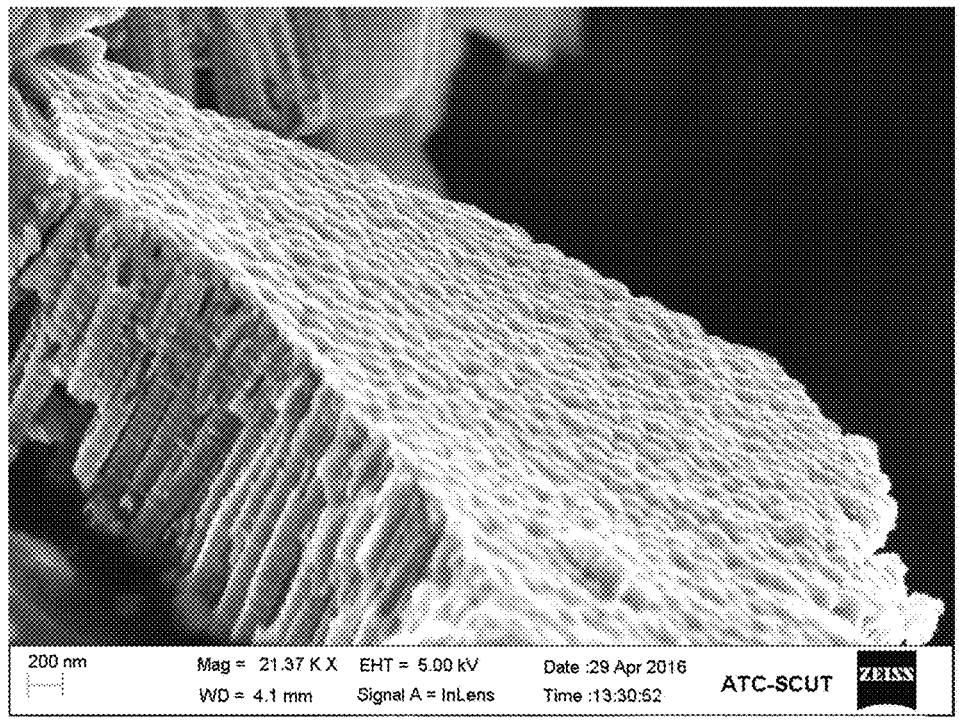
FIG. 2b is an SEM image of a bottom surface of the transparent free-standing titanium dioxide nanotube array film prepared in Example 2.

SEM images of a side surface and a bottom surface of the obtained transparent free-standing titanium dioxide nanotube array film are respectively shown in FIG. 2a and FIG. 2b. As seen from FIG. 2a and FIG. 2b, the obtained film has a complete morphology, and the titanium dioxide nanotubes in the film have a tube length of 3.8 μm.

Figure 3:
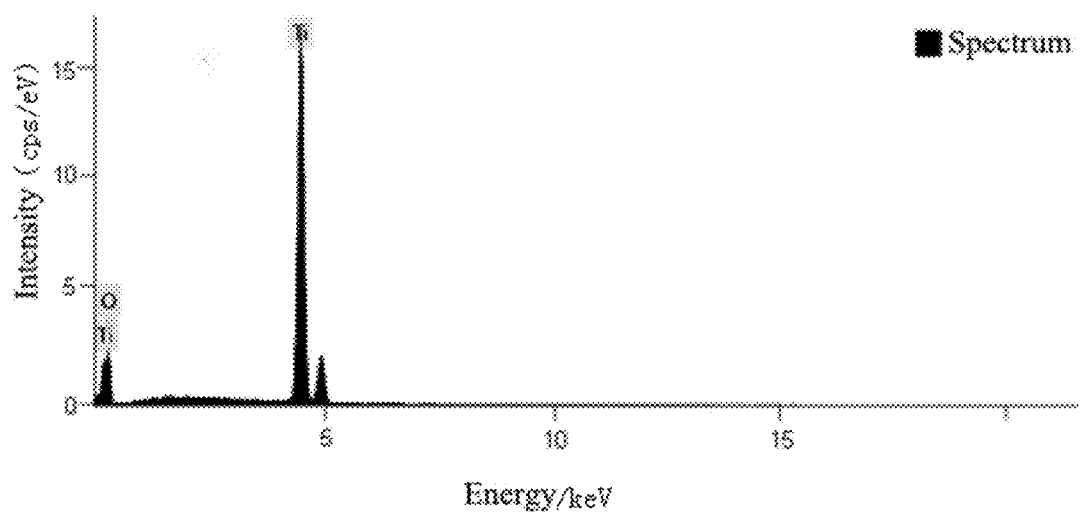
FIG. 3 is an EDS analysis image of the transparent free-standing titanium dioxide nanotube array film prepared in Example 2.

An EDS analysis image of the obtained transparent free-standing titanium dioxide nanotube array film is shown in FIG. 3. As seen from FIG. 3, the film only contains two elements of titanium and oxygen, and it is further determined that the titanium dioxide nanotubes are successfully prepared.

Figure 4:
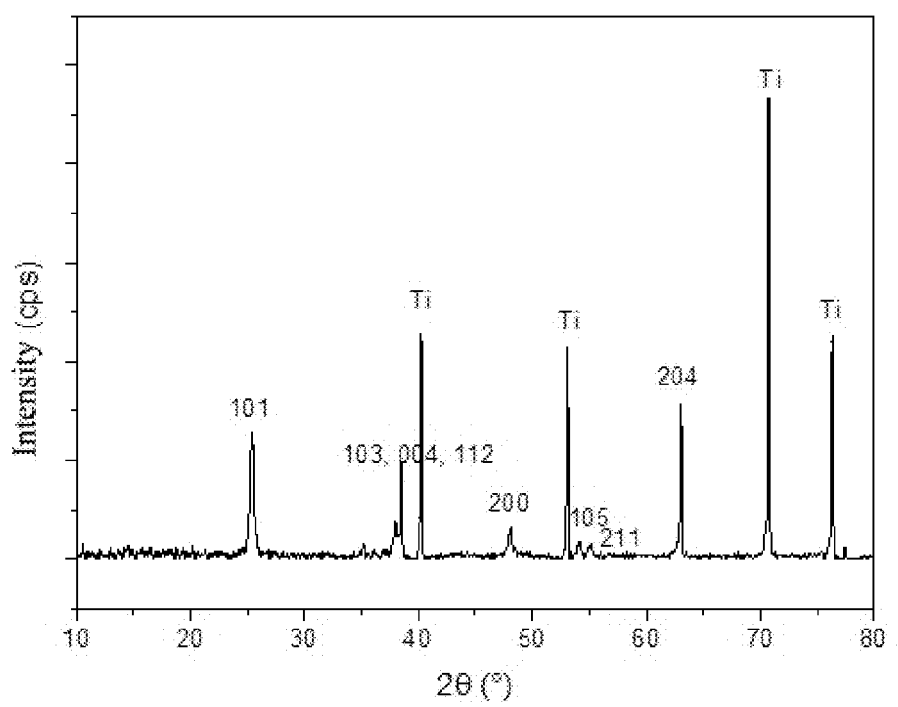
FIG. 4 is an XRD image of the transparent free-standing titanium dioxide nanotube array film prepared in Example 2 after being subjected to thermal treatment at 450° C.

An XRD image of the obtained transparent free-standing titanium dioxide nanotubes after being subjected to thermal treatment at 450° C. is shown in FIG. 4. As seen from FIG. 4, in addition to diffraction peaks (40°, 53°, 70° and 76°) of the titanium substrate, the curve simultaneously shows that diffraction peaks near 25°, 38°, 48° and 55° represent the diffraction peaks of the anatase phase, which comply with a standard card of the anatase phase titanium dioxide. It indicates that the nanotube array film is the anatase phase titanium dioxide.

In addition, texts on the paper beneath the film can be clearly seen through the titanium dioxide nanotube array film, which indicates that the transparent free-standing titanium dioxide nanotube array film is obtained by the method according to the present invention.

EXAMPLE 3

(1) Pre-treatment of titanium foil: A titanium foil having a purity of 99.0% and a thickness of 0.01 mm was cut into a rectangular shape, the rectangular titanium foil was sequentially ultrasonically cleaned in acetone, ethanol and deionized water for 20 minutes to remove oil contaminants on the surface of the titanium foil, and then the titanium foil was naturally dried for future use.

(2) Anode oxidation: The pre-treated titanium foil was connected to a positive electrode of a power supply, and a platinum electrode was connected to a negative electrode of the power supply, a 2.5 cm spacing was defined between these two electrodes, an electrolyte is a glycol solution containing 0.55 wt % of ammonium fluoride and 20 wt % of deionized water, and anode oxidation was carried out by applying a voltage of 30 V for 2 hours at room temperature; and upon completion of reaction, a prepared sample was cleaned with the deionized water and naturally dried to obtain a titanium foil with a titanium dioxide nanotube array film grown on the surface thereof.

(3) High temperature annealing: The titanium foil with the titanium dioxide nanotube array film grown on the surface thereof was placed into a Muffle furnace, the temperature was raised to 100° C. at a heating rate of 10° C./min and maintained at 100° C. for 10 minutes; the temperature was then raised to 200° C. at a heating rate of 10° C./min and maintained at 200° C. for 10 minutes; and finally the temperature was raised to 300° C. and 400° C. at a heating rate of 10° C./min and likewise maintained at 300° C. and 400° C. for 10 minutes respectively, until the temperature reached 450° C.; and the temperature was maintained at 450° C. for 4 hours, and then the furnace was cooled to room temperature to obtain a transparent free-standing titanium dioxide nanotube array film having an anatase crystal shape.

The titanium dioxide nanotubes in the film have an average tube diameter of 110 nm, an average wall thickness of 13 nm and a tube length of 3.8 μm. Texts on the paper beneath the film can be clearly seen through the titanium dioxide nanotube array film.

EXAMPLE 4

(1) Pre-treatment of titanium foil: A titanium foil having a purity of 99.7% and a thickness of 0.02 mm was cut into a rectangular shape, the rectangular titanium foil was sequentially ultrasonically cleaned in acetone, ethanol and deionized water for 15 minutes to remove oil contaminants on the surface of the titanium foil, and then the titanium foil was naturally dried for future use.

(2) Anode oxidation: The pre-treated titanium foil was connected to a positive electrode of a power supply, and a platinum electrode was connected to a negative electrode of the power supply, a 2.5 cm spacing was defined between these two electrodes, an electrolyte is a glycol solution containing 0.55 wt % of ammonium fluoride and 20 wt % of deionized water, and anode oxidation was carried out by applying a voltage of 30 V for 2 hours at room temperature; and upon completion of reaction, a prepared sample was cleaned with the deionized water and naturally dried to obtain a titanium foil with a titanium dioxide nanotube array film grown on the surface thereof.

(3) High temperature annealing: The titanium foil with the titanium dioxide nanotube array film grown on the surface thereof was placed into a Muffle furnace, the temperature was raised to 100° C. at a heating rate of 10° C./min and maintained at 100° C. for 10 minutes; the temperature was then raised to 200° C. at a heating rate of 10° C./min and maintained at 200° C. for 10 minutes; and finally the temperature was raised to 300° C. and 400° C. at a heating rate of 10° C./min and likewise maintained at 300° C. and 400° C. for 10 minutes respectively, until the temperature reached 450° C.; and the temperature was maintained at 450° C. for 6 hours, and then the furnace was cooled to room temperature to obtain a transparent free-standing titanium dioxide nanotube array film having an anatase crystal shape.

The titanium dioxide nanotubes in the film have an average tube diameter of 110 nm, an average wall thickness of 13 nm and a tube length of 3.8 μm. Texts on the paper beneath the film can be clearly seen through the titanium dioxide nanotube array film.

EXAMPLE 5

(1) Pre-treatment of titanium foil: A titanium foil having a purity of 99.7% and a thickness of 0.01 mm was cut into a rectangular shape, the rectangular titanium foil was sequentially ultrasonically cleaned in acetone, ethanol and deionized water for 10 minutes to remove oil contaminants on the surface of the titanium foil, and then the titanium foil was naturally dried for future use.

(2) Anode oxidation: The pre-treated titanium foil was connected to a positive electrode of a power supply, and a platinum electrode was connected to a negative electrode of the power supply, a 2.5 cm spacing was defined between these two electrodes, an electrolyte is a glycol solution containing 0.55 wt % of ammonium fluoride and 20 wt % of deionized water, and anode oxidation was carried out by applying a voltage of 30 V for 6 hours at room temperature; and upon completion of reaction, a prepared sample was cleaned with the deionized water and naturally dried to obtain a titanium foil with a titanium dioxide nanotube array film grown on the surface thereof.

(3) High temperature annealing: The titanium foil with the titanium dioxide nanotube array film grown on the surface thereof was placed into a Muffle furnace, the temperature was raised to 100° C. at a heating rate of 10° C./min and maintained at 100° C. for 10 minutes; the temperature was then raised to 200° C. at a heating rate of 10° C./min and maintained at 200° C. for 10 minutes; and finally the temperature was raised to 300° C. and 400° C. at a heating rate of 10° C./min and likewise maintained at 300° C. and 400° C. for 10 minutes respectively, until the temperature reached 450° C.; and the temperature was maintained at 450° C. for 2 hours, and then the furnace was cooled to room temperature to obtain a transparent free-standing titanium dioxide nanotube array film having an anatase crystal shape.

In the obtained transparent free-standing titanium dioxide nanotube array film, the titanium dioxide nanotubes have an average tube diameter of 110 nm, an average wall thickness of 13 nm and a tube length of 7.1 μm. Texts on the paper beneath the film can be clearly seen through the titanium dioxide nanotube array film.

EXAMPLE 6

(1) Pre-treatment of titanium foil: A titanium foil having a purity of 99.7% and a thickness of 0.01 mm was cut into a rectangular shape, the rectangular titanium foil was sequentially ultrasonically cleaned in acetone, ethanol and deionized water for 10 minutes to remove oil contaminants on the surface of the titanium foil, and then the titanium foil was naturally dried for future use.

(2) Anode oxidation: The pre-treated titanium foil was connected to a positive electrode of a power supply, and a platinum electrode was connected to a negative electrode of the power supply, a 2.5 cm spacing was defined between these two electrodes, an electrolyte is a glycol solution containing 0.55 wt % of ammonium fluoride and 15 wt % of deionized water, and anode oxidation was carried out by applying a voltage of 30 V for 4 hours at room temperature; and upon completion of reaction, a prepared sample was cleaned with the deionized water and naturally dried to obtain a titanium foil with a titanium dioxide nanotube array film grown on the surface thereof.

(3) High temperature annealing: The titanium foil with the titanium dioxide nanotube array film grown on the surface thereof was placed into a Muffle furnace, the temperature was raised to 100° C. at a heating rate of 10° C./min and maintained at 100° C. for 10 minutes; the temperature was then raised to 200° C. at a heating rate of 10° C./min and maintained at 200° C. for 10 minutes; and finally the temperature was raised to 300° C. and 400° C. at a heating rate of 10° C./min and likewise maintained at 300° C. and 400° C. for 10 minutes respectively, until the temperature reached 450° C.; and the temperature was maintained at 450° C. for 2 hours, and then the furnace was cooled to room temperature to obtain a transparent free-standing titanium dioxide nanotube array film having an anatase crystal shape.

In the obtained transparent free-standing titanium dioxide nanotube array film, the titanium dioxide nanotubes have an average tube diameter of 90 nm, an average wall thickness of 22 nm and a tube length of 6.7 μm. Texts on the paper beneath the film can be clearly seen through the titanium dioxide nanotube array film.

EXAMPLE 7

(1) Pre-treatment of titanium foil: A titanium foil having a purity of 99.7% and a thickness of 0.01 mm was cut into a rectangular shape, the rectangular titanium foil was sequentially ultrasonically cleaned in acetone, ethanol and deionized water for 10 minutes to remove oil contaminants on the surface of the titanium foil, and then the titanium foil was naturally dried for future use.

(2) Anode oxidation: The pre-treated titanium foil was connected to a positive electrode of a power supply, and a platinum electrode was connected to a negative electrode of the power supply, a 2.5 cm spacing was defined between these two electrodes, an electrolyte is a glycol solution containing 0.55 wt % of ammonium fluoride and 5 wt % of deionized water, and anode oxidation was carried out by applying a voltage of 30 V for 4 hours at room temperature; and upon completion of reaction, a prepared sample was cleaned with the deionized water and naturally dried to obtain a titanium foil with a titanium dioxide nanotube array film grown on the surface thereof.

(3) High temperature annealing: The titanium foil with the titanium dioxide nanotube array film grown on the surface thereof was placed into a Muffle furnace, the temperature was raised to 100° C. at a heating rate of 10° C./min and maintained at 100° C. for 10 minutes; the temperature was then raised to 200° C. at a heating rate of 10° C./min and maintained at 200° C. for 10 minutes; and finally the temperature was raised to 300° C. and 400° C. at a heating rate of 10° C./min and likewise maintained at 300° C. and 400° C. for 10 minutes respectively, until the temperature reached 450° C.; and the temperature was maintained at 450° C. for 2 hours, and then the furnace was cooled to room temperature to obtain a transparent free-standing titanium dioxide nanotube array film having an anatase crystal shape.

In the obtained transparent free-standing titanium dioxide nanotube array film, the titanium dioxide nanotubes have an average tube diameter of 50 nm, an average wall thickness of 30 nm and a tube length of 6.7 μm. Texts on the paper beneath the film can be clearly seen through the titanium dioxide nanotube array film.

What is claimed is:

1. A method for preparing a transparent free-standing titanium dioxide nanotube array film, comprising the following steps:
    (1) using a titanium foil subjected to pre-treatment as an anode and an inert electrode as a cathode, placing the cathode and the anode into an organic electrolyte, applying a voltage, and carrying out anode oxidation at room temperature; and upon completion of the oxidation, washing the anode with deionized water, naturally drying to obtain a titanium foil with a titanium dioxide nanotube array film grown on a surface thereof; the titanium foil has a thickness of 0.01-0.02 mm, and the titanium foil has a purity of 99.0-99.9%; the pre-treatment comprises ultrasonic cleaning the titanium foil sequentially in acetone, ethanol and deionized water for 10 to 20 minutes, and naturally drying the titanium foil; and
    (2) carrying out high temperature annealing for the titanium foil with the titanium dioxide nanotube array film grown on the surface thereof, and cooling to room temperature upon completion of the high temperature annealing, such that the titanium dioxide nanotube array film on the surface of the titanium foil falls off and the transparent free-standing titanium dioxide nanotube array film in anatase phase is obtained,
    wherein in step (2), the high temperature annealing is carried out in an air atmosphere by increasing the temperature to 450° C. at a heating rate of 10° C./min and maintaining the temperature for 2-6 hours, wherein in step (2), a temperature raising process of the high temperature annealing comprises: raising the temperature to 100° C. at the heating rate of 10° C./min, and maintaining the temperature at 100° C. for 10 minutes; then raising the temperature to 200° C. at the heating rate of 10° C./min, and maintaining the temperature at 200° C. for 10 minutes; and raising the temperature to 300° C. and 400° C. at the heating rate of 10° C./min, and likewise maintaining the temperature at 300° C. and 400° C. for 10 minutes respectively, until the temperature reaches 450° C.

2. The method for preparing the transparent free-standing titanium dioxide nanotube array film according to claim 1, wherein in step (1), the inert electrode comprises a platinum electrode, a graphite electrode or a gold electrode.

3. The method for preparing the transparent free-standing titanium dioxide nanotube array film according to claim 1, wherein in step (1), the organic electrolyte is a glycol solution containing 0.55 wt % of ammonium fluoride and 5-20 wt % of deionized water.

4. The method for preparing the transparent free-standing titanium dioxide nanotube array film according to claim 1, wherein in step (1), the voltage applied in the anode oxidation is 30 V.

5. The method for preparing the transparent free-standing titanium dioxide nanotube array film according to claim 1, wherein in step (1), the anode oxidation lasts 2-6 hours.

\* \* \* \* \*